United States Patent
Song et al.

(10) Patent No.: US 11,924,024 B2
(45) Date of Patent: Mar. 5, 2024

(54) SWITCHING METHOD AND APPARATUS, DEVICE, AND STORAGE MEDIUM

(71) Applicant: ZTE CORPORATION, Guangdong (CN)

(72) Inventors: Xueyan Song, Guangdong (CN); Yong Chen, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/912,188

(22) PCT Filed: Mar. 12, 2021

(86) PCT No.: PCT/CN2021/080441
§ 371 (c)(1),
(2) Date: Sep. 16, 2022

(87) PCT Pub. No.: WO2021/185169
PCT Pub. Date: Sep. 23, 2021

(65) Prior Publication Data
US 2023/0132861 A1    May 4, 2023

(30) Foreign Application Priority Data
Mar. 16, 2020   (CN) .......................... 202010182757.2

(51) Int. Cl.
*H04L 41/0663*    (2022.01)
*H04L 41/0668*    (2022.01)
*H04L 45/28*    (2022.01)

(52) U.S. Cl.
CPC ...... *H04L 41/0663* (2013.01); *H04L 41/0668* (2013.01); *H04L 45/28* (2013.01)

(58) Field of Classification Search
CPC .. H04L 41/0663; H04L 41/0668; H04L 45/28
(Continued)

(56) References Cited

U.S. PATENT DOCUMENTS

| 10,684,925 | B2* | 6/2020 | Tang | .................... | G06F 11/0754 |
| 2006/0230129 | A1* | 10/2006 | Swami | ................ | H04W 12/126 |
| | | | | | 709/223 |

(Continued)

FOREIGN PATENT DOCUMENTS

| CN | 107707649 A | 2/2018 |
| CN | 108616431 A | 10/2018 |

(Continued)

OTHER PUBLICATIONS

English Translation of the International Search Report dated May 26, 2021, for PCT/CN2021/080441.

(Continued)

*Primary Examiner* — Tauqir Hussain
(74) *Attorney, Agent, or Firm* — KDW Firm PLLC

(57) ABSTRACT

Provided are a switching method and apparatus, a device, and a storage medium. The method includes: executing a protection switching operation in response to detecting a switching trigger condition, synchronizing, by a local first-type communication node, protection group switching related state information to a second-type communication node, and synchronously forwarding, by the second-type communication node, the protection group switching related state information of the local first-type communication node to an opposite first-type communication node.

18 Claims, 5 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2010/0177630 | A1* | 7/2010 | He | H04L 12/40189 370/217 |
| 2011/0235522 | A1* | 9/2011 | Matoba | H04L 43/0817 370/400 |
| 2012/0113835 | A1* | 5/2012 | Alon | H04L 45/58 370/252 |
| 2012/0294140 | A1* | 11/2012 | Cheung | H04L 45/24 370/216 |
| 2012/0315031 | A1* | 12/2012 | Zhong | H04Q 11/00 398/8 |
| 2016/0277211 | A1* | 9/2016 | Kumar | H04L 61/5014 |
| 2017/0026227 | A1* | 1/2017 | Lian | H04L 45/00 |
| 2017/0279764 | A1* | 9/2017 | Nishikawa | H04L 61/5014 |
| 2019/0227840 | A1* | 7/2019 | Bacher | H04L 41/0893 |
| 2020/0136912 | A1* | 4/2020 | Song | H04L 41/0895 |
| 2022/0407802 | A1* | 12/2022 | Xiao | H04L 45/34 |
| 2023/0018911 | A1* | 1/2023 | Zha | H04L 43/0811 |

FOREIGN PATENT DOCUMENTS

| | | | | |
|---|---|---|---|---|
| CN | 108880917 | A | | 11/2018 |
| CN | 110061855 | A | | 7/2019 |
| CN | 110430115 | A | | 11/2019 |
| CN | 108616431 | B | * 9/2020 | ........... H04L 12/287 |
| EP | 2536068 | A1 | | 12/2012 |

OTHER PUBLICATIONS

Chinese Search Report for Application No. 202010827572 dated Jul. 13, 2023.

Chinese Office Action for Application No. 202010827572 dated Jul. 20, 2023.

* cited by examiner

SWITCHING METHOD AND APPARATUS, DEVICE, AND STORAGE MEDIUM

CROSS-REFERENCES TO RELATED APPLICATIONS

This is a National Stage Application, filed under 35 U.S.C. 371, of International Patent Application No. PCT/CN2021/080441, filed on Mar. 12, 2021, which is based on and claims priority to Chinese Patent Application No. 202010182757.2 filed with the China National Intellectual Property Administration (CNIPA) on Mar. 16, 2020, the disclosure of which is incorporated herein by reference in its entirety.

TECHNICAL FIELD

The present application relates to communications and, in particular, to a switching method and apparatus, a device, and a storage medium.

BACKGROUND

A virtual broadband remote access server (vBRAS) device with the control plane and the user plane separated includes two parts: a vBRAS-control plane (vBRAS-CP) and a vBRAS-user plane (vBRAS-UP). According to the requirements of traffic orchestration and network scale deployment, a Management and Orchestration (MANO) system may add or delete virtual resources vBRAS-CP or vBRAS-UP through a virtualized network function manager (VNFM) to achieve dynamic flexible scalability, contributing to the rational utilization of resources. The communication between the CU and the UP is achieved between the vBRAS-CP and the vBRAS-UP through a control plane interface protocol. How to achieve the switching protection between the vBRAS-CP and the vBRAS-UP in the case of external link failure and node failure is an urgent problem to be solved.

SUMMARY

Embodiments of the present application provide a switching method and apparatus, a device, and a storage medium, so as to effectively achieve the switching protection between virtualized network resource control plane function and user plane function.

The present application is illustrated using an example of the implementation of the protection switching procedure of the vBRAS-CP by the vBRAS-CP and the vBRAS-UP, but is not limited to the protection of the vBRAS-CP, and is suitable for all the implementation of the switching protection of control plane network functions in the case of separation of virtualized network resource control plane and user plane of the transmission network.

In an embodiment, the embodiments of the present application provide a switching method. The method is applied to a first-type communication node and includes the following operations. A protection switching operation is executed in response to detecting a switching trigger condition.

A local first-type communication node synchronizes protection group switching related state information to a second-type communication node, and the second-type communication node synchronously forwards the protection group switching related state information of the local first-type communication node to an opposite first-type communication node, where the protection group switching related state information includes local state data and protection group state information.

In an embodiment, the embodiments of the present application provide a switching method. The method is applied to a second-type communication node and includes the following.

Protection group switching related state information of a local first-type communication node and protection group switching related state information of an opposite first-type communication node are acquired.

The protection group switching related state information of the local first-type communication node is synchronized to the opposite first-type communication node, where the protection group switching related state information includes local state data and protection group state information. In an embodiment, the embodiments of the present application provide a switching apparatus. The apparatus is applied to a first-type communication node and includes an execution module and a first synchronization module.

The execution module is configured to execute a protection switching operation in response to detecting a switching trigger condition.

The first synchronization module is configured to synchronize, by a local first-type communication node, protection group switching related state information to a second-type communication node, and synchronously forward, by the second-type communication node, the protection group switching related state information of the local first-type communication node to an opposite first-type communication node, where the protection group switching related state information includes local state data and protection group state information.

In an embodiment, the embodiments of the present application provide a switching apparatus. The apparatus is applied to a second-type communication node and includes a third acquisition module and a second synchronization module.

The third acquisition module is configured to acquire protection group switching related state information of a local first-type communication node and protection group switching related state information of an opposite first-type communication node.

The second synchronization module is configured to synchronize the protection group switching related state information of the local first-type communication node to the opposite first-type communication node, where the protection group switching related state information includes local state data and protection group state information.

The embodiments of the present application provide a device. The device includes a memory and one or more processors.

The memory is configured to store one or more programs.

The one or more programs, when executed by the one or more processors, enable the one or more processors to implement the method of any one of the preceding embodiments.

The embodiments of the present application further provide a storage medium. The storage medium is configured to store a computer program, and the computer program, when executed by a processor, implements the method of any one of the preceding embodiments.

DETAILED DESCRIPTION

The embodiments of the present application are described below in conjunction with drawings. The bottleneck of conventional broadband remote access server (BRAS) devices lies not in forwarding but lies in control. Theoretically, a single device can access 256K or 512K concurrent session control. However, in actual use, due to the capability of master control, in the field network environment with the complex overlay traffic, a single device generally only accesses low concurrent session at most. If the concurrent session is beyond the capability of the single device, operators perform capacity expansion on the device, and not all forwarding slots of the device are used. The control user (CU)-separated vBRAS architecture breaks the performance bottleneck of the conventional BRAS main control panel. The single control plane of the vBRAS provides the user access capability of the level of tens of millions. Compared with the conventional BRAS device, the users of the single control plane of the vBRAS are hundreds of times higher, and the online rate of users is ten times higher; for the user plane stripped off from the control plane, the number of concurrent sessions and the user access rate are also greatly improved, the number of concurrent sessions is increased by 5 times, and the online rate is increased by 3 times. The CU-separated vBRAS device includes two parts: the control plane vBRAS-CP and the user plane vBRAS-UP. According to the requirements of traffic orchestration and network scale deployment, a MANO system may add or delete virtual resources vBRAS-CP or vBRAS-UP through a VNFM to achieve dynamic flexible scalability, contributing to the rational utilization of resources.

The communication between the control plane and the user plane is achieved between the vBRAS-CP and the vBRAS-UP through the control plane interface protocol. In order to ensure that the user traffic does not go down, the internal component protection, external link failure protection and node failure protection of the CP and the UP need to be achieved, thereby achieving the hot standby protection of the traffic and providing the user switching non-aware service.

How to achieve the switching protection between the vBRAS-CP and the vBRAS-UP in the case of external link failure and node failure is an urgent problem to be solved. In view of the above, the embodiments of the present application provide a switching method to achieve the switching protection between the vBRAS-CP and the vBRAS-UP.

Figure 1:
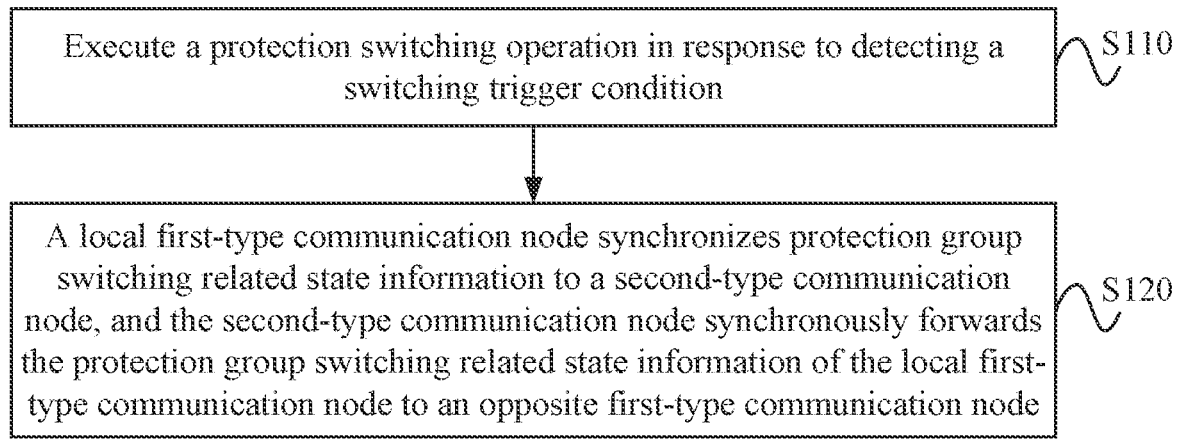
FIG. 1 is a flowchart of a switching method according to an embodiment of the present application.

In an embodiment, FIG. 1 is a flowchart of a switching method according to an embodiment of the present application. This embodiment is applied to a first-type communication node. For example, the first-type communication node may be a network function node control plane, that is, the vBRAS-CP. As shown in FIG. 1, the switching method in this embodiment includes S110 and S120.

In S110, a protection switching operation is executed in response to detecting a switching trigger condition.

In S120, a local first-type communication node synchronizes protection group switching related state information to a second-type communication node, and the second-type communication node synchronously forwards the protection group switching related state information of the local first-type communication node to an opposite first-type communication node.

In an embodiment, the protection group switching related state information includes local state data and protection group state information. In an embodiment, the protection group state information refers to the master and standby states of first-type communication nodes. For example, if the local first-type communication node is a master first-type communication node, the protection group state information of the local first-type communication node includes that the local first-type communication node is a master node and the opposite first-type communication node is a standby node. Accordingly, if the local first-type communication node is a standby first-type communication node, the protection group state information of the local first-type communication node includes that the local first-type communication node is a standby node and the opposite first-type communication node is a master node. In an embodiment, at least two first-type communication nodes are configured, one first-type communication node serves as the local first-type communication node and the other first-type communication node serves as the opposite first-type communication node. In other words, one first-type communication node is the master first-type communication node and the other first-type communication node is the standby first-type communication node. In an embodiment, in a case where the local first-type communication node is the master first-type communication node, the opposite first-type communication node is the standby first-type communication node. For example, in a case where the master first-type communication node fails, the local state data of the local first-type communication node (that is, the master first-type communication node) and the protection group state information may be synchronized to the opposite first-type communication node (that is, the standby first-type communication node) through the second-type communication node. In an embodiment, in a case where the local first-type communication node is the standby first-type communication node, the opposite first-type communication node is the master first-type communication node. For example, in a case where the master first-type communication node is recovered from the failure, the local first-type communication node (that is, the standby first-type communication node) may synchronize the local state data of the local first-type communication node and the protection group state information to the opposite first-type communication node (that is, the master first-type communication node) through the second-type communication node. In an embodiment, the second-type communication node is a network function node user plane, that is, the vBRAS-UP. The second-type communication node is configured to perform data forwarding and synchronization between the master first-type communication node and the standby first-type communication node. In an embodiment, when the local first-type communication node detects the switching trigger condition, the local first-type communication node may synchronize the data information of the local first-type communication node to the opposite first-type communication node through the second-type communication node which serves as a data forwarding node. The second-type communication node may be a first-type communication node of a third party. In an embodiment of the present application, the UP serves as the user plane function of the CP and is used for replacing the CP of the third party, thereby reducing the hardware cost, reducing the traffic complexity and improving the traffic forwarding efficiency.

In an embodiment, before the protection switching operation is executed in response to detecting the switching trigger condition, the method further includes: configuring protection group members and protection group information of each protection group member.

In an embodiment, the protection group members include the local first-type communication node and the opposite first-type communication node.

The protection group information of the local first-type communication node at least includes a configuration of a protection group member, a priority configuration of the protection group member and a protection group related configuration.

The protection group information of the opposite first-type communication node at least includes a configuration of a protection group member, a priority configuration of a protection group member and a protection group related configuration.

In an embodiment, the operation that the protection group information is configured for each protection group member may be understood as: when the first-type communication node is the local first-type communication node, the local first-type communication node configures its own protection group information, for example, another protection group member of the local first-type communication node is configured as the opposite first-type communication node; the priority configuration of the protection group member is the magnitudes of the priorities of the local first-type communication node and the opposite first-type communication node; the protection group related configuration may include the wait to restore time (WTR) of the local first-type communication node or the opposite first-type communication node, preemption strategy, and the like. In an embodiment, the first-type communication node (the local first-type communication node or the opposite first-type communication node) itself configures the protection group members and the protection group information of each protection group member, and the second-type communication node is configured to forward data information between two first-type communication nodes.

In an embodiment, the operation that the protection group information is configured for each protection group member is: in a case where the local first-type communication node fails, the protection group related state information of the local first-type communication node is forwarded, so as to enable the opposite first-type communication node in the protection group members of the local first-type communication node to perform switching protection. For example, in an embodiment, the protection group switching related state information of the local first-type communication node may be synchronously forwarded through the second-type communication node.

In an embodiment, before the protection switching operation is executed in response to detecting the switching trigger condition, the method further includes the following.

The local first-type communication node acquires current state data of the opposite first-type communication node in the protection group members through the second-type communication node.

The opposite first-type communication node acquires current state data of the local first-type communication node in the protection group members through the second-type communication node.

In an embodiment, before the first-type communication node (which may be the local first-type communication node or the opposite first-type communication node) detects the switching trigger condition, the local first-type communication node may acquires the current state data of the opposite first-type communication node in the protection group members through the second-type communication node; and in addition, the opposite first-type communication node may acquire the current state data of the local first-type communication node in the protection group members through the second-type communication node. It is to be understood that before the first-type communication node detects the switching trigger condition, the local first-type communication node and the opposite first-type communication node need to synchronize information, that is, the local first-type communication node and the opposite first-type communication node acquire the current state data from each other.

In an embodiment, the switching trigger condition includes one of the following: an external link failure between the first-type communication node and the second-type communication node or a first-type communication node failure. In an embodiment, in a case where the first-type communication node is the local first-type communication node, when an external link between the local first-type communication node and the second-type communication node fails or when the local first-type communication node itself fails, the local first-type communication node synchronizes its own protection group switching related state information to the second-type communication node and synchronizes the protection group switching related state information to the opposite first-type communication node through the second-type communication node. In an embodiment, in a case where the local first-type communication node is the master first-type communication node, the mater first-type communication node synchronizes its own protection group switching related state information to the second-type communication node and synchronously forwards the protection group switching related state information to the opposite first-type communication node (that is, the standby first-type communication node) through the second-type communication node, so as to achieve the switching protection procedure of nodes. In an embodiment, in a case where the local first-type communication node is the standby first-type communication node, the standby first-type communication node synchronizes its own protection group switching related state information to the second-type communication node and synchronously forwards the protection group switching related state information to the opposite first-type communication node (that is, the master first-type communication node) through the second-type communication node, so as to achieve the switching protection procedure of nodes. In an embodiment, the local state data includes one of the following: a priority configuration situation between the master first-type communication node and the standby first-type communication node, a connection detection situation between the master first-type communication node and the second-type communication node, an availability detection situation of the master first-type communication node, or a heartbeat line detection situation between the master first-type communication node and the standby first-type communication node.

In an embodiment, the priority configuration situation between the master first-type communication node and the standby first-type communication node refers to the configuration situation of the magnitudes of the priorities of the master first-type communication node and the standby first-type communication node. For example, if the priority of the master first-type communication node is higher than the priority of the standby first-type communication node, in a case where the current state data of the master first-type communication node is operating normally, the master first-type communication node may serve as the local first-type communication node, and the standby first-type communication node may serve as the opposite first-type communication node, that is, when the master first-type communication node fails, the standby first-type communication node is enabled for data communication. In an embodiment, the connection detection situation between the master first-type communication node and the second-type communication node refers to whether the communication connection between the between the master first-type communication node and the second-type communication node fails. In an embodiment, the availability detection situation of the master first-type communication node refers to whether the current state data of the master first-type communication node is all normal. In an embodiment, the heartbeat line detection situation of the master first-type communication node and the standby first-type communication node refers to whether the heartbeat line runs normally when a heartbeat line scenario is established between the master first-type communication node and the standby first-type communication node.

In an embodiment, in a case where the heartbeat line detection situation between the master first-type communication node and the standby first-type communication node is available, the master first-type communication node and the standby first-type communication node are determined according to the priority configuration situation and the current state data. In an embodiment, when the heartbeat line detection condition of the master first-type communication node and the standby first-type communication node is available, the master first-type communication node and the standby first-type communication node may directly communicate without the need for the second-type communication node to forward data.

In an embodiment, the current state data includes one of the following: a node physical state or a node port state, and the priority configuration situation includes wait to restore time (WTR) or a preemption strategy. In an embodiment, the node physical state refers to the physical state information of the first-type communication node, for example, the node physical state may include: power-on and power-off; the node port state refers to the port state information of the first-type communication nodes, for example, the node port state may include physical down (that is, a failure occurs in the hardware aspect) and protocol down (that is, a failure occurs in the IP layer). In an embodiment, the wait to restore time refers to the waiting time required when the first-type communication node is recovered from the failure, for example, the wait to restore time may be several seconds or several minutes, which is not limited thereto and may be configured according to the actual situation; the preemption strategy may be understood as the priority of the first-type communication node, for example, when the current state data of two first-type communication nodes is normal, the first-type communication node with a higher priority may serve as the master first-type communication node (that is, the local first-type communication node).

In an embodiment, the master first-type communication node and the standby first-type communication node are nodes of different network domains. In an embodiment, if each first-type communication node needs to be reachable through a plurality of routes, the master first-type communication node and the standby first-type communication node may be configured in different network domains. The master first-type communication node and the standby first-type communication node are nodes of different network domains, and it can also be understood that the master first-type communication node and the standby first-type communication node are cross-data center (DC) applications.

In an embodiment, the first-type communication node and the second-type communication node belong to the same network domain, and the first-type communication node reaches the second-type communication node through multiple hops. In an embodiment, a plurality of nodes exist between the first-type communication node and the second-type communication node to perform multiple hops, that is, the first-type communication node needs multiple hops to reach the second-type communication node.

Figure 2:
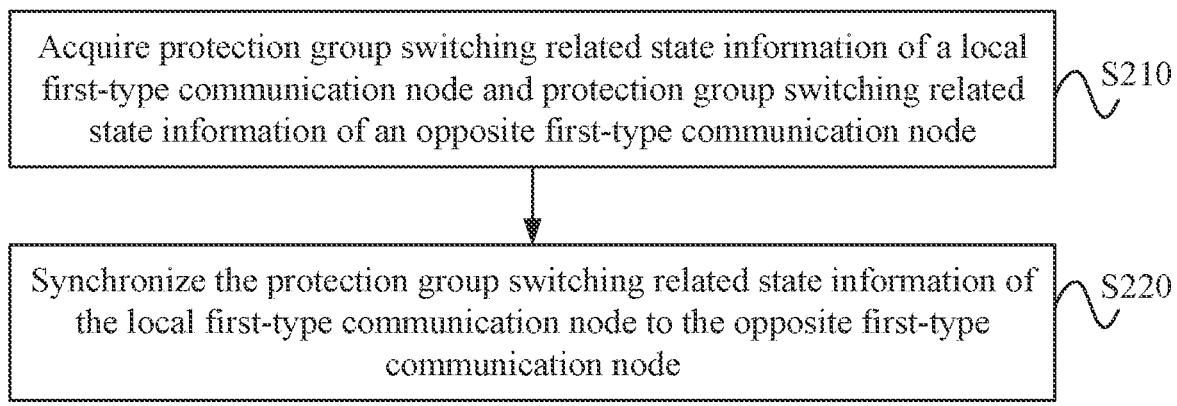
FIG. 2 is a flowchart of another switching method according to an embodiment of the present application.

FIG. 2 is a flowchart of another switching method according to an embodiment of the present application. This embodiment is applied to a second-type communication node. For example, the second-type communication node may be a network function node user plane, that is, the vBRAS-UP. As shown in FIG. 2, the switching method includes this embodiment includes S210 and S220.

In S210, protection group switching related state information of a local first-type communication node and protection group switching related state information of an opposite first-type communication node are acquired.

In S220, the protection group switching related state information of the local first-type communication node is synchronized to the opposite first-type communication node.

In an embodiment, the protection group switching related state information includes local state data and protection group state information. For the explanation of the local state data and the protection group state information, reference may be made to the description of the preceding embodiments, and details will not be repeated here. In a case where a first-type communication node fails or the external link between the first-type communication node and the second-type communication node fails, the local first-type communication node may synchronize and forward its own protection group switching related state information to the opposite first-type communication node through the second-type communication node. In an embodiment, in a case where the local first-type communication node is a master first-type communication node, the corresponding opposite first-type communication node is a standby first-type communication node; in a case where the local first-type communication node is a standby first-type communication node, the corresponding opposite first-type communication node is a master first-type communication node. For example, assuming that the local first-type communication node is the master first-type communication node, that is, the master first-type communication node fails, the master first-type communication node synchronizes its own protection group switching related information to the standby first-type communication node (that is, the opposite first-type communication node) so that the standby first-type communication node continues data processing. It is to be understood that the original standby first-type communication node becomes a new master first-type communication node. After the original master first-type communication node is recovered from the failure, the standby first-type communication node which is the local first-type communication node at this point may synchronize and forward the protection group switching related state information to the opposite first-type communication node (that is, the master first-class communication node) through the second-type communication node.

In an embodiment, the switching method applied to the second-type communication node further includes: the protection group switching related state information of the local first-type communication node and the protection group switching related state information of the opposite first-type communication node are stored in a local database. In an embodiment, in order to retrieve and synchronize the data information of the master first-type communication node or the standby first-type communication node, the protection group switching related state information of the local first-type communication node and the protection group switching related state information of the opposite first-type communication node may be stored in the local database (when the local first-type communication node is the master first-type communication node (or the standby first-type communication node), the opposite first-type communication node is the standby first-type communication node (or the master first-type communication node)).

In an embodiment, the operation that the protection group switching related state information of the local first-type communication node is synchronized to the opposite first-type communication node includes: in response to acquiring a switching trigger condition, the protection group switching related state information of the local first-type communication node is synchronized to the opposite first-type communication node. In an embodiment, when the second-type communication node acquires that the first-type communication node fails or the link between the first-type communication node and the second-type communication node fails, the second-type communication node may synchronize the protection group switching related state information of the local first-type communication node to the opposite first-type communication node.

Figure 3:
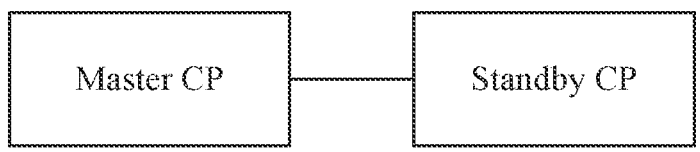
FIG. 3 is a schematic diagram illustrating the communication connection between a master first-type communication node and a standby first-type communication node according to an embodiment of the present application.

In an implementation, in a case where a heartbeat line is established between the master first-type communication node and the standby first-type communication node and the heartbeat line is available, a user information entry may be synchronized at the two first-type communication nodes. For example, the master first-type communication node is denoted as a master CP, and the standby first-type communication node is a standby CP. FIG. 3 is a schematic diagram illustrating the communication connection between a master first-type communication node and a standby first-type communication node according to an embodiment of the present application.

As shown in FIG. 3, the master CP needs to locally generate and maintain the user information entry, and meanwhile, the master CP needs to synchronize the user information entry information to the standby CP. The master CP may achieve the synchronization with the standby CP through Transmission Control Protocol (TCP) and other protocols so that the user information entries on the master CP and the standby CP are consistent. In an embodiment, before the communication between the heartbeat lines, the master and standby CP election is completed between the two CPs, that is, the master CP and the standby CP are determined.

Figure 4:
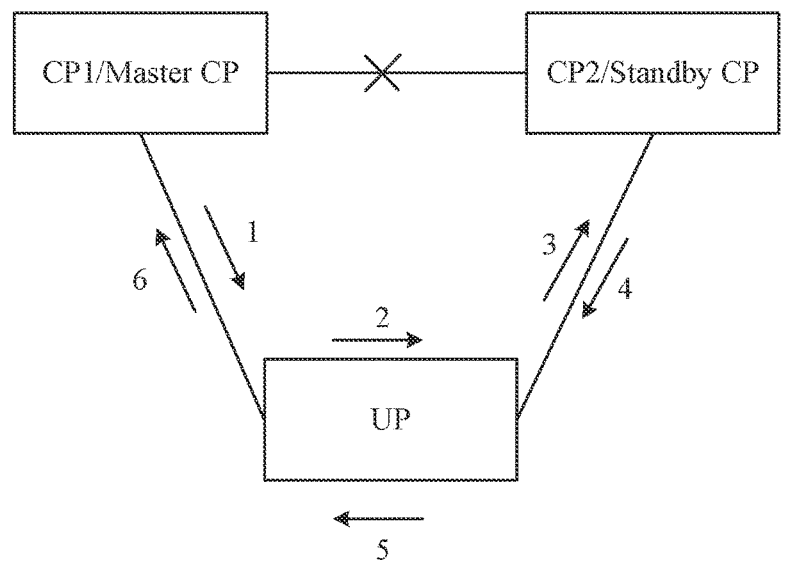
FIG. 4 is a schematic diagram illustrating the communication connection between a master first-type communication node, a standby first-type communication node and a second-type communication node according to an embodiment of the present application.

In an embodiment, in a case where the heartbeat line between the master first-type communication node and the standby first-type communication node is disconnected, the data between the master first-type communication node and the standby first-type communication node may be forwarded through the UP. For example, the master first-type communication node is denoted as CP1, the standby first-type communication node is CP2, and the second-type communication node is denoted as UP. FIG. 4 is a schematic diagram illustrating the communication connection between a master first-type communication node, a standby first-type communication node and a second-type communication node according to an embodiment of the present application.

In an embodiment, in order to solve the link detection failure between the CP and the UP, when the CP node fails, the CP performs the protection switching processing mechanism. As shown in FIG. 4, the flow of this embodiment is executed according to the serial numbers in FIG. 4.

In 1, the CP1 synchronizes the interface state on the CP1 and CP1 protection group configuration information to the UP through a control interface protocol between the CP1 and the UP.

For example, the control plane interface protocol may be a Control Plane and User Plane Separated Protocol (CUSP), a Packet Forwarding Control Protocol (PFCP) of the 3rd Generation Partnership Project (3GPP), which is not limited thereto.

In 2, the UP locally stores and maintains the state information entry of the CP1.

In 3, the UP notifies the acquired state information entry of the CP1 to the CP2 through the control interface protocol.

In 4, the CP2 also carries the state information entry of the CP2 through the control interface protocol and sends the state information entry to the UP.

In 5, the UP locally stores and maintains the state information entry of the CP2.

In 6, the UP notifies the acquired state information entry of the CP2 to the CP1 through the control interface protocol.

In 7, the CP1 and the CP2 perform CP election according to a preset rule through the CP state information transmitted by the UP.

Figure 5:
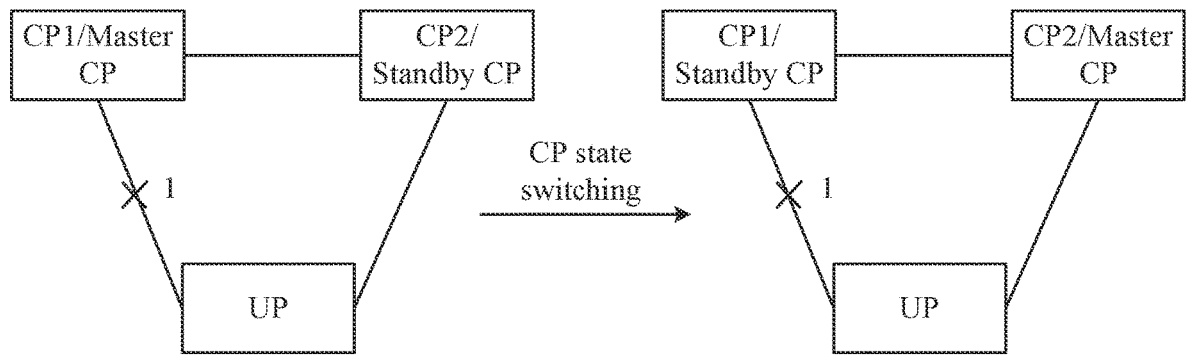
FIG. 5 is a schematic diagram illustrating another communication connection between a master first-type communication node, a standby first-type communication node and a second-type communication node according to an embodiment of the present application.

In an embodiment, in a case where the link between the master first-type communication node and the second-type communication node fails, there is a manner of achieving the data communication between the master first-type communication node and the standby first-type communication node. For example, the master first-type communication node is denoted as a master CP, the standby first-type communication node is a standby CP, and the second-type communication node is denoted as a UP. FIG. 5 is a schematic diagram illustrating another communication connection between a master first-type communication node, a standby first-type communication node and a second-type communication node according to an embodiment of the present application. In an embodiment, the link 1 only represents the connectivity of the master CP to the UP and does not represent a direct link. In practical application, there are many nodes needed to pass between the master CP and the UP.

As shown in FIG. 5, the flow of this embodiment includes 1 to 4.

In 1, the master CP detects that the connection between the master CP and the UP goes down, manages that the state of the local master CP goes down, and switches the state of the master CP to the standby CP.

In 2, the UP detects that the link between the UP and the master CP fails, locally stores the connection state with the master CP, and reports to the standby CP that the connection state of the master CP goes down.

In 3, the standby CP detects the report that the connection state of the master CP goes down from the UP.

In 4, the standby CP immediately switches the state of the local CP to the master CP according to a configuration strategy (when the situation that the connection state of the master CP goes down, it means that the master CP is unavailable).

Figure 6:
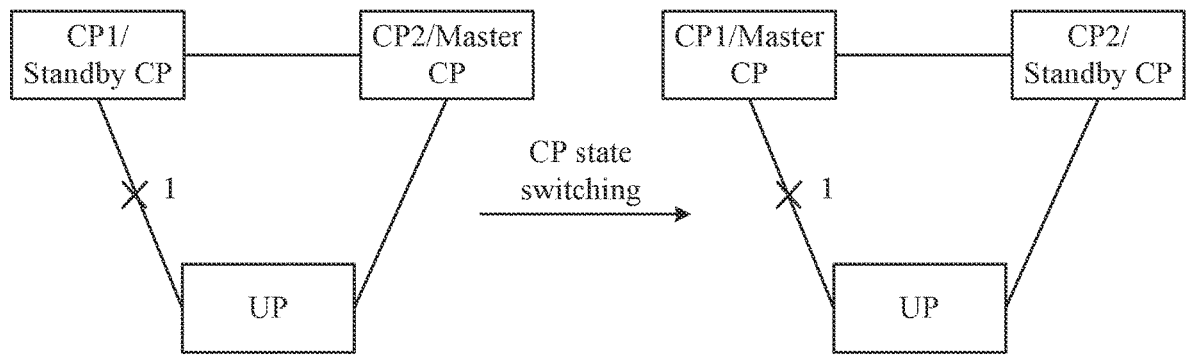
FIG. 6 is a schematic diagram illustrating another communication connection between a master first-type communication node, a standby first-type communication node and a second-type communication node according to an embodiment of the present application.

In an embodiment, in a case where the link between the master first-type communication node and the second-type communication node is recovered from the failure, there is a manner of achieving the data communication between the master first-type communication node and the standby first-type communication node. For example, the master first-type communication node is denoted as a master CP, the standby first-type communication node is a standby CP, and the second-type communication node is denoted as a UP. FIG. 6 is a schematic diagram illustrating another communication connection between a master first-type communication node, a standby first-type communication node and a second-type communication node according to an embodiment of the present application.

In this embodiment, in a case where the link 1 between the UP and the master CP shown in FIG. 5 fails, the original master CP (CP1) is switched to the standby CP and the original standby CP (CP2) is switched to the master CP, the link 1 between the UP and the master CP is recovered from the failure. As shown in FIG. 6, the flow of this embodiment includes 1 to 3.

Step 1, the CP1 detects that the link between the CP1 and the UP is recovered, and the CP1 waits to be switched to the master CP.

In an embodiment, the wait to restore time may be pre-configured or the device has a default waiting switching time.

In 2, the UP detects that the link between the UP and the CP1 is recovered, locally stores this state, and reports the link recovery state between the UP and the CP1 to the CP2.

In 3, the CP2 switches the state of the local CP2 to standby after the CP2 acquires information notified by the UP that the UP-CP1 link state is recovered and the CP1 state is available.

In an embodiment, the process of switching to standby also needs to wait for a wait to restore time (WTR). The duration of the WTR may be pre-configured, or there may be a default waiting switching time.

Figure 7:
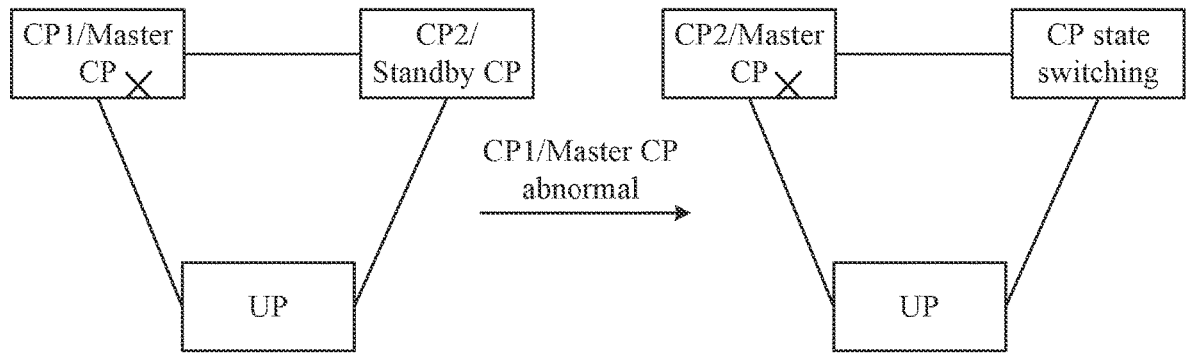
FIG. 7 is a schematic diagram illustrating another communication connection between a master first-type communication node, a standby first-type communication node and a second-type communication node according to an embodiment of the present application.

In an embodiment, in a case where the master first-type communication node fails, there is a manner of achieving the data communication between the master first-type communication node and the standby first-type communication node. For example, the master first-type communication node is denoted as a master CP, the standby first-type communication node is a standby CP, and the second-type communication node is denoted as a UP. FIG. 7 is a schematic diagram illustrating another communication connection between a master first-type communication node, a standby first-type communication node and a second-type communication node according to an embodiment of the present application. For example, the failure of the master CP may be the failure of the entire VNF. As shown in FIG. 7, the flow of this embodiment includes 1 to 3.

In 1, when the master CP (CP1) node fails, the UP detects that the state of the master CP (CP1) is unavailable, locally stores this state, and reports the state of the CP1 (master CP) to the standby CP (CP2).

In 2, after the standby CP (CP2) acquires the state of the CP1 reported by the UP, the standby CP (CP2) switches the local CP to the master CP according to the protection group configuration strategy of the local CP.

In 3, the UP acquires the state of the new master CP (CP2) and maintains the state information entry of the local UP.

Figure 8:
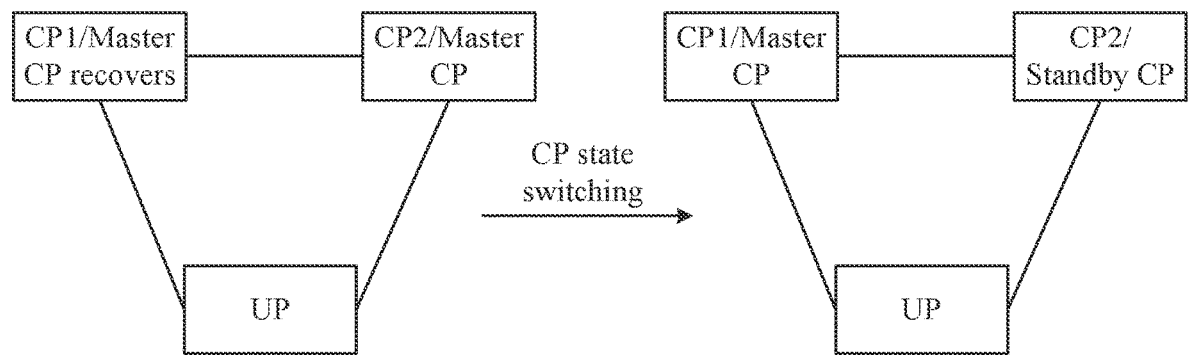
FIG. 8 is a schematic diagram illustrating another communication connection between a master first-type communication node, a standby first-type communication node and a second-type communication node according to an embodiment of the present application.

In an embodiment, in a case where the master first-type communication node fails and then recovered from the failure, there is a manner of achieving the data communication between the master first-type communication node and the standby first-type communication node. For example, the master first-type communication node is denoted as a master CP, the standby first-type communication node is a standby CP, and the second-type communication node is denoted as a UP. FIG. 8 is a schematic diagram illustrating another communication connection between a master first-type communication node, a standby first-type communication node and a second-type communication node according to an embodiment of the present application. As shown in FIG. 8, the flow of this embodiment includes 1 to 3.

In this embodiment, in a case where the link 1 between the UP and the master CP shown in FIG. 7 fails, the original master CP (CP1) is switched to the standby CP and the original standby CP (CP2) is switched to the master CP, and the master CP is recovered from the failure. For example, in a case where the master CP (CP1) node is recovered from the failure, the master and standby states of the CPs corresponding to the UP are switched.

In 1, after the original master CP (CP1) node is recovered from the failure, the local CP1 node first sets the state of the local CP1 as the standby CP, and the CP2 node is still the master CP.

In 2, the UP detects that the original master CP (CP1) node is recovered from the failure and the state of the CP1 is available, stores the state of the CP1, and reports the state information to the CP2 (the current master CP).

In 3, after the current master CP (CP2) acquires the state information of the CP1 reported by the UP, the current master CP (CP2) switches the local master CP to a CP waiting to be switched to standby according to the protection strategy configuration of the local CP.

In an embodiment, the wait to restore time (WTR) may be pre-configured or a default WTR configuration may be adopted.

In 4, the CP1 node (the current standby CP) recovered from the failure switches the local standby CP to a CP waiting to be switched to master according to the protection strategy configuration of the local CP.

In an embodiment, the wait to restore time (WTR) may be pre-configured or a default WTR configuration may be adopted. In an embodiment, the CP waiting switching time of the CP1 should be consistent with that of the CP2.

Figure 9:
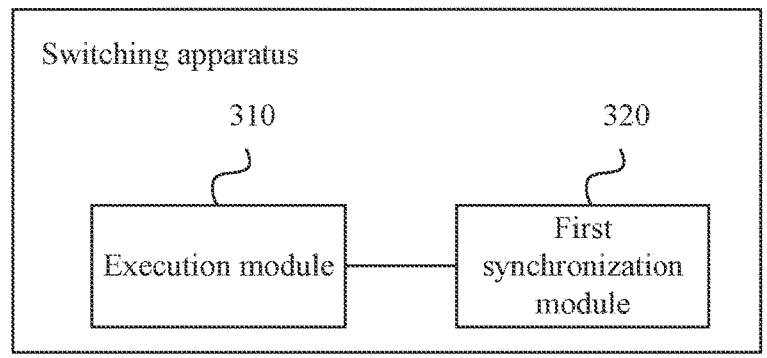
FIG. 9 is a structural diagram of a switching apparatus according to an embodiment of the present application.

In an embodiment, FIG. 9 is a structural diagram of a switching apparatus according to an embodiment of the present application. This embodiment is applied to a first communication node. As shown in FIG. 9, the switching apparatus in this embodiment includes an execution module 310 and a first synchronization module 320.

The execution module 310 is configured to execute a protection switching operation in response to detecting a switching trigger condition.

The first synchronization module 320 is configured to synchronize, by a local first-type communication node, protection group switching related state information to a second-type communication node, and synchronously forward, by the second-type communication node, the protection group switching related state information of the local first-type communication node to an opposite first-type communication node, where the protection group switching related state information includes local state data and protection group state information.

In an embodiment, the switching apparatus applied to the first communication node further includes a first configuration module.

The first configuration module is configured to, before the protection switching operation is executed in response to detecting the switching trigger condition, configure protection group members and protection group information of each protection group member.

The protection group members include the local first-type communication node and the opposite first-type communication node.

The protection group information of the local first-type communication node at least includes a configuration of a protection group member, a priority configuration of a protection group member and a protection group related configuration.

The protection group information of the opposite first-type communication node at least includes a configuration of a protection group member, a priority configuration of a protection group member and a protection group related configuration.

In an embodiment, the switching apparatus applied to the first communication node further includes a first acquisition module and a second acquisition module.

The first acquisition module is configured to, before the protection switching operation is executed in response to detecting the switching trigger condition, acquire, by the local first-type communication node, current state data of the opposite first-type communication node in the protection group members through the second-type communication node.

The second acquisition module is configured to acquire, by the opposite first-type communication node, current state data of the local first-type communication node in the protection group members through the second-type communication node.

In an embodiment, the switching trigger condition includes one of the following: an external link failure between the first-type communication node and the second-type communication node or a first-type communication node failure.

In an embodiment, the local state data includes one of the following: a priority configuration situation between the master first-type communication node and the standby first-type communication node, a connection detection situation between the master first-type communication node and the second-type communication node, an availability detection situation of the master first-type communication node, or a heartbeat line detection situation between the master first-type communication node and the standby first-type communication node.

In an embodiment, in a case where the heartbeat line detection situation between the master first-type communication node and the standby first-type communication node is available, the master first-type communication node and the standby first-type communication node are determined according to the priority configuration situation and the current state data.

In an embodiment, the current state data includes one of the following: a node physical state or a node port state.

The priority configuration situation includes wait to restore time (WTR) or a preemption strategy. In an embodiment, the master first-type communication node and the standby first-type communication node are nodes of different network domains.

In an embodiment, the first-type communication node and the second-type communication node belong to the same network domain, and the first-type communication node reaches the second-type communication node through multiple hops.

In an embodiment, the first-type communication node is a network function node control plane, and the second-type communication node is a network function node user plane.

The switching apparatus provided in this embodiment is configured to implement the switching method applied to the first communication node in the embodiment shown in FIG. 1. The implementation principles and technical effects of the switching apparatus provided in this embodiment are similar to those of the switching method, and details are not repeated herein.

Figure 10:
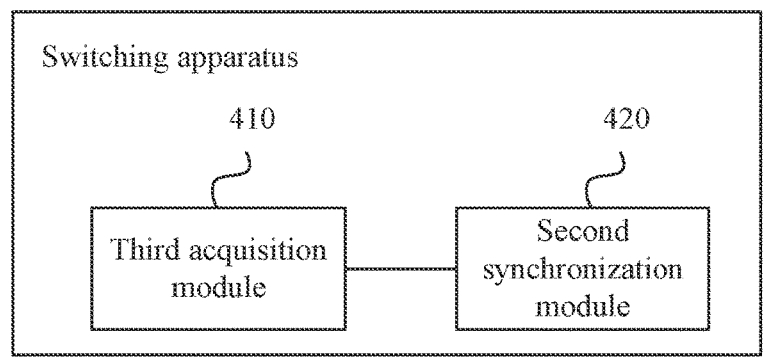
FIG. 10 is a structural diagram of another switching apparatus according to an embodiment of the present application.

In an embodiment, FIG. 10 is a structural diagram of another switching apparatus according to an embodiment of the present application. This embodiment is applied to a second communication node. As shown in FIG. 10, this embodiment includes a third acquisition module 410 and a second synchronization module 420.

The third acquisition module 410 is configured to acquire protection group switching related state information of a local first-type communication node and protection group switching related state information of an opposite first-type communication node.

The second synchronization module 420 is configured to synchronize the protection group switching related state information of the local first-type communication node to the opposite first-type communication node, where the protection group switching related state information includes local state data and protection group state information.

In an embodiment, the switching apparatus applied to the second communication node further includes a storage module.

The storage module is configured to store the protection group switching related state information of the local first-type communication node and the protection group switching related state information of the opposite first-type communication node to a local database.

In an embodiment, the operation that the protection group switching related state information of the local first-type communication node is synchronized to the opposite first-type communication node includes the following.

In response to acquiring a switching trigger condition, the protection group switching related state information of the local first-type communication node is synchronized to the opposite first-type communication node.

Figure 11:
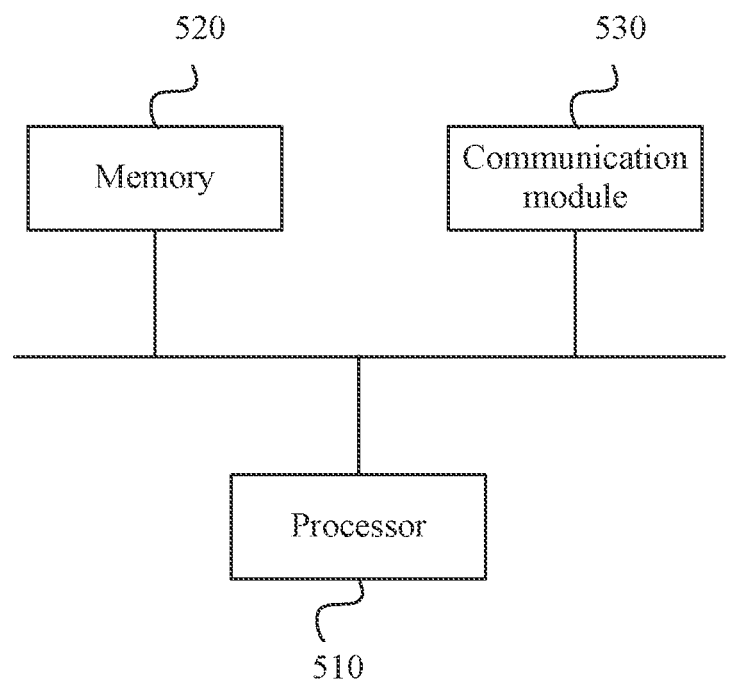
FIG. 11 is a structural diagram of a device according to an embodiment of the present application.

The switching apparatus provided in this embodiment is configured to implement the switching method applied to the second communication node in the embodiment shown in FIG. 2. The implementation principles and technical effects of the switching apparatus provided in this embodiment are the similar to those of the switching method, and details are not repeated herein. FIG. 11 is a structural diagram of a device according to an embodiment of the present application. As shown in FIG. 11, the device provided in the present application includes a processor 510, a memory 520 and a communication module 530. The number of processors 510 in the device may be one or more, and one processor 510 is illustrated as an example in FIG. 11. The number of memories 520 in the device may be one or more, and one memory 510 is illustrated as an example in FIG. 11. The processor 510, the memory 520 and the communication module 530 in the device may be connected via a bus or in other manners, and the connection via the bus is illustrated as an example in FIG. 11. In this embodiment, the device is a first communication node.

The memory 520, as a computer-readable storage medium, may be configured to store software programs and computer-executable programs and modules such as program instructions/modules corresponding to the device in any embodiment of the present application (such as the execution module and the first synchronization module in the switching apparatus). The memory 520 may include a program storage region and a data storage region, where the program storage region may store an operating system and an application program required by at least one function, and the data storage region may store data created depending on the use of the device. Moreover, the memory 520 may include a high-speed random-access memory, and may further include a non-volatile memory such as at least one magnetic disk memory, a flash memory or another non-volatile solid-state memory. In some examples, the memory 520 may further include memories located remotely relative to the processor 510 and these remote memories may be connected to the apparatus via networks. Examples of the preceding network include, but are not limited to, the Internet, an intranet, a local area network, a mobile communication network, and a combination thereof.

The communication module 530 is configured to establish a communication connection between the first communication node and the second communication node for data communication and signal communication.

The preceding device may be configured to perform the switching method applied to the first communication node in any preceding embodiment and has corresponding functions and effects. In a case where the device is the second communication node, the preceding device may be configured to perform the switching method applied to the second communication node in any preceding embodiment and has corresponding functions and effects.

An embodiment of the present application further provides a storage medium containing computer-executable instructions. The computer-executable instructions, when executed by a computer processor, are used for performing the switching method applied to the first communication node, and the method includes the following: a protection switching operation is executed in response to detecting a switching trigger condition, a local first-type communication node synchronizes protection group switching related state information to a second-type communication node, and the second-type communication node synchronously forwards the protection group switching related state information of the local first-type communication node to an opposite first-type communication node, where the protection group switching related state information includes local state data and protection group state information.

An embodiment of the present application further provides a storage medium containing computer-executable instructions. The computer-executable instructions, when executed by a computer processor, are used for performing the switching method applied to the second communication node, and the method includes the following: protection group switching related state information of a local first-type communication node and protection group switching related state information of an opposite first-type communication node are acquired, and the protection group switching related state information of the local first-type communication node is synchronized to the opposite first-type communication node, where the protection group switching related state information includes local state data and protection group state information.

It is to be understood by those skilled in the art that the term "user equipment" covers any suitable type of wireless user equipment, for example, a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disk (CD)). Computer-readable media may include non-transitory storage media. The data processor may be in any type suitable for a local technical environment, for example, but not limited to, a general-purpose computer, a special-purpose computer, a microprocessor, a digital signal processor (DSP), an application-specific integrated circuit (ASIC), a field-programmable gate array (FGPAFPGA), and a processor based on a multi-core processor architecture.

What is claimed is:

1. A switching method, applied to a local first-type communication node and comprising:
   executing a protection switching operation in response to detecting a switching trigger condition; and
   synchronizing protection group switching related state information to a second-type communication node, and enabling the second-type communication node to synchronously forward the protection group switching related state information of the local first-type communication node to an opposite first-type communication node;
   wherein before the executing the protection switching operation in response to detecting the switching trigger condition, the method further comprises:
   configuring protection group members and protection group information of each of the protection group members, wherein the protection group members comprise the local first-type communication node and the opposite first-type communication node; wherein
   the protection group information of the local first-type communication node at least comprises a configuration of a protection group member, a priority configuration of the protection group member and a protection group related configuration; and
   the protection group information of the opposite first-type communication node at least comprises a configuration of a protection group member, a priority configuration of the protection group member and a protection group related configuration.

2. The method of claim 1, before executing the protection switching operation in response to detecting the switching trigger condition, further comprising:
   acquiring, by the local first-type communication node, current state data of the opposite first-type communication node in the protection group members through the second-type communication node.

3. The method of claim 1, wherein the switching trigger condition comprises one of the following: an external link failure between a first-type communication node and the second-type communication node or a first-type communication node failure, wherein the first-type communication node comprises the local first-type communication node and the opposite first-type communication node.

4. The method of claim 1, wherein the local first-type communication node is the master first-type communication node and the opposite first-type communication node is the standby first-type communication node, or the local first-type communication node is the standby first-type communication node and the opposite first-type communication node is the master first-type communication node.

5. The method of claim 4, wherein in a case where the heartbeat line detection situation between the master first-type communication node and the standby first-type communication node is available, the master first-type communication node and the standby first-type communication node are determined according to the priority configuration situation and the current state data.

6. The method of claim 5, wherein the current state data comprises one of the following: a node physical state or a node port state; and
   the priority configuration situation comprises a priority sequence between the local first-type communication node and the opposite first-type communication node.

7. The method of claim 2, wherein the master first-type communication node and the standby first-type communication node are nodes of different network domains.

8. The method of claim 2, wherein the first-type communication node and the second-type communication node are in a same network domain, and are multi-hop reachable the first-type communication node reaches the second-type communication node through multiple hops.

9. The method of claim 2, wherein the first-type communication node is a network function node control plane, and the second-type communication node is a network function node user plane.

10. A switching method, applied to a second-type communication node and comprising:
    acquiring protection group switching related state information of a local first-type communication node and protection group switching related state information of an opposite first-type communication node; and
    synchronizing the protection group switching related state information of the local first-type communication node to the opposite first-type communication node;
    wherein protection group members and protection group information of each of the protection group members are configured by the first-type communication node;
    wherein the protection group members comprise the local first-type communication node and the opposite first-type communication node; wherein
    the protection group information of the local first-type communication node at least comprises a configuration of a protection group member, a priority configuration of the protection group member and a protection group related configuration; and
    the protection group information of the opposite first-type communication node at least comprises a configuration of a protection group member, a priority configuration of the protection group member and a protection group related configuration.

11. The method of claim 10, further comprising:
    storing the protection group switching related state information of the local first-type communication node and the protection group switching related state information of the opposite first-type communication node in a local database.

12. The method of claim 10, wherein synchronizing the protection group switching related state information of the local first-type communication node to the opposite first-type communication node comprises:
    in response to acquiring a switching trigger condition, synchronizing the protection group switching related state information of the local first-type communication node to the opposite first-type communication node.

13. A switching apparatus, applied to a local first-type communication node and comprising: a memory and at least one processor;
    wherein the memory is configured to store at least one program; and the at least one program, when executed by the at least one processor, enables the at least one processor to implement a switching method, wherein the switching method comprises:
    executing a protection switching operation in response to detecting a switching trigger condition; and
    synchronizing protection group switching related state information to a second-type communication node, and enabling the second-type communication node to synchronously forward the protection group switching related state information of the local first-type communication node to an opposite first-type communication node;

wherein before the executing the protection switching operation in response to detecting the switching trigger condition, the method further comprises:

configuring protection group members and protection group information of each of the protection group members, wherein the protection group members comprise the local first-type communication node and the opposite first-type communication node; wherein the protection group information of the local first-type communication node at least comprises a configuration of a protection group member, a priority configuration of the protection group member and a protection group related configuration; and the protection group information of the opposite first-type communication node at least comprises a configuration of a protection group member, a priority configuration of the protection group member and a protection group related configuration.

14. A communication node, comprising a memory and at least one processor; wherein the memory is configured to store at least one program; and the at least one program, when executed by the at least one processor, enables the at least one processor to implement the method of claim 1.

15. A non-transitory storage medium storing a computer program, wherein the computer program, when executed by a processor, implements the method of claim 1.

16. The switching apparatus of claim 13, before executing the protection switching operation in response to detecting the switching trigger condition, further comprising:

acquiring, by the local first-type communication node, current state data of the opposite first-type communication node in the protection group members through the second-type communication node.

17. The switching apparatus of claim 13, wherein the switching trigger condition comprises one of the following: an external link failure between a first-type communication node and the second-type communication node or a first-type communication node failure, wherein the first-type communication node comprises the local first-type communication node and the opposite first-type communication node.

18. The switching apparatus of claim 13, wherein the local first-type communication node is the master first-type communication node and the opposite first-type communication node is the standby first-type communication node, or the local first-type communication node is the standby first-type communication node and the opposite first-type communication node is the master first-type communication node.

* * * * *